UNITED STATES PATENT OFFICE.

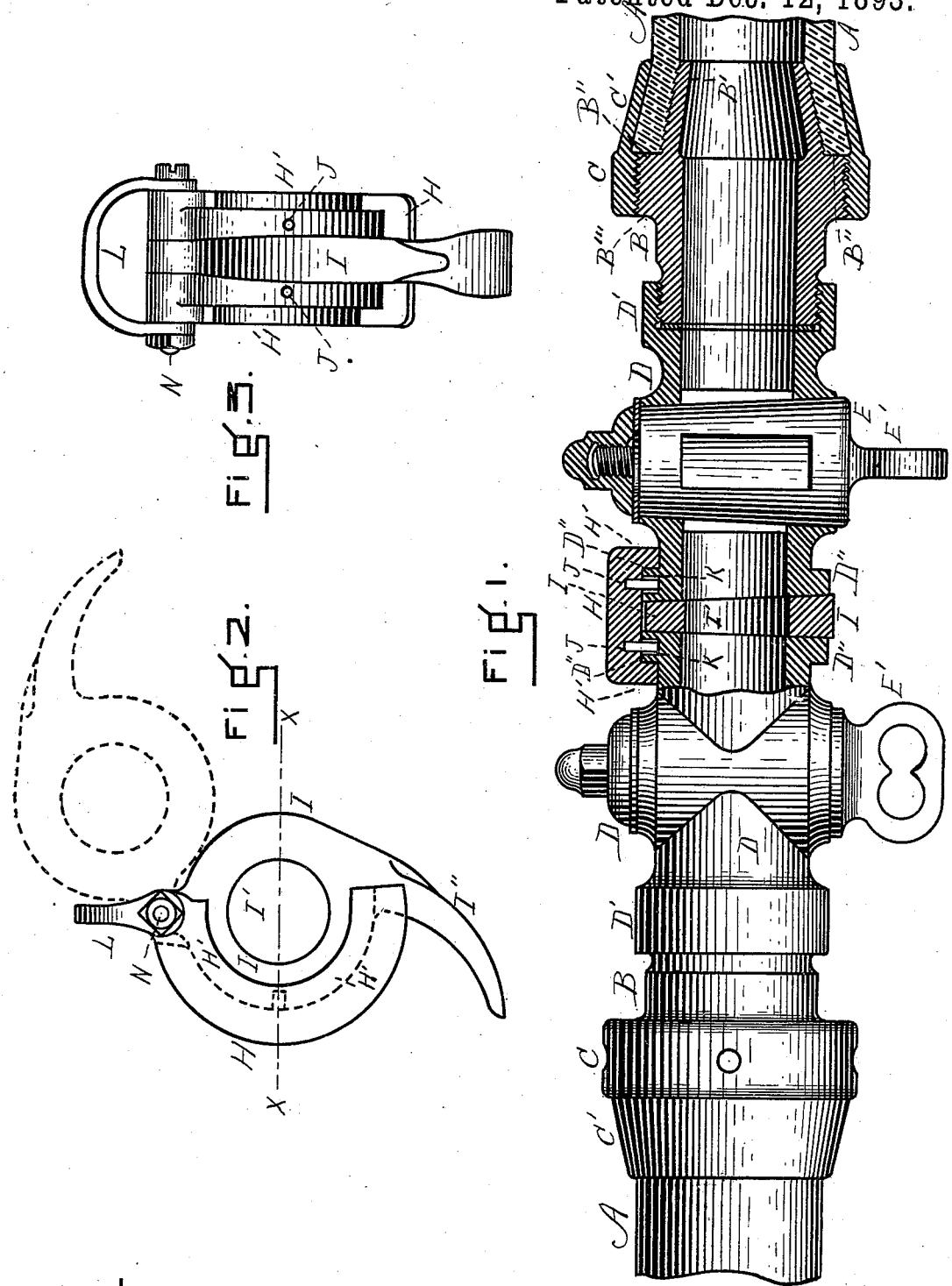

JAMES C. MITCHELL, OF LANCASTER, NEW HAMPSHIRE, ASSIGNOR OF ONE-HALF TO ALDEN L. BAILEY, OF ST. JOHNSBURY, VERMONT.

PIPE-COUPLING.

SPECIFICATION forming part of Letters Patent No. 510,437, dated December 12, 1893.

Application filed April 6, 1893. Serial No. 469,355. (No model.)

*To all whom it may concern:*

Be it known that I, JAMES C. MITCHELL, a citizen of the United States, residing at Lancaster, in the county of Coos and State of New Hampshire, have invented new and useful Improvements in Pipe-Couplings, of which the following is a specification.

This invention relates particularly to couplings for flexible or water pipes such as are used in connection with railway cars, but I do not limit myself to the style of pipe or to its use in connection with steam or water or both.

In the accompanying drawings, in which similar letters of reference indicate like parts, Figure 1 is a view partly in plan and partly in horizontal section of my improved pipe coupling connecting two flexible pipes or tubes such as are used beneath railway cars, the valve on one side being represented as open and on the other side as closed, and the sectional portion of the view being taken on line $x$, Fig. 2. Fig. 2 is a side view of the latch removed, its position when closed being shown in full lines and when open in broken lines. Fig. 3 is a front view of the same.

A A represent end portions of two flexible pipes which are supposed to extend beneath two cars and are to be connected between them. The adjacent end of each pipe A, is placed over the slightly conical or tapered end B' of the pipe B, said end being externally screw threaded or serrated as shown. This pipe B is provided with an annular shoulder B'' and its thicker portion B'''' thus produced is provided externally with a screw thread, as is also the thinner end of the pipe opposite the end B'.

C is a collar or ring internally screw-threaded to engage the thread on the portion B''' of the pipe B and provided with a cone shaped extension C' tapered to correspond with the portion B' above described.

To unite an end of the coupling with the pipe A, the ring C is unscrewed and the end of the pipe A passed through it onto the threaded portion B' of the pipe B. The ring C is then screwed upon the portion B''' of the pipe B with the effect of drawing the end of the pipe A up on the portion B' of the pipe B against the shoulder B'', such action being accomplished by the rotation of the extension C', and its movement forward on the pipe B during such rotation. Thus, the coupling and the pipe A are firmly united in a water-tight and steam tight joint.

D is the valve tube, its rear end D' screwing onto the end of the pipe B, and its front end being provided with an integral annular flange or ring D''.

E is an ordinary valve contained therein and provided with the usual thumb-piece E'.

The portions above described, on each side of the center, that is, connected with each pipe-end A, are exactly the same and are lettered correspondingly. The portions, when once applied to the ends of flexible pipes beneath the cars, usually remain in such position and are intended to be united or secured together by a tubular latch which consists essentially of two jaws H and I. The jaw H is of the shape of a half circle and is provided with two inward flanges H' so that its inner side is essentially a curved broad groove, provided with pins or teats J which fit into corresponding holes K in the portions D'' of the valve-tubes. The upper end of the jaw H is provided with a hinged bail L. The jaw I is hinged by means of the pin N to the jaw H and consists essentially of a ring whose perforation I' is coincident with the passages in the pipes D. This jaw is provided with an integral tail-piece I'' serving as a handle. Moreover, the jaw I is not of even thickness throughout but is graduated as shown in Figs. 1 and 3, it increasing gradually in thickness from its upper to its lower portion and from its outer to its inner portion so that it is substantially wedge shaped.

In order to unite the two portions of the coupling, the latch is placed with its pins J in engagement with the holes K in the pipes D, and the jaw I drawn down from the position shown in broken lines in Fig. 2 into that shown in full lines in the three figures, crowding the annular flanges or rings D' on the pipes D apart and between said jaw I and the semicircular flanges H' on the jaw H. By this means a very tight connection is produced, and one which is not liable to be accidentally loosened, and one, moreover, into which foreign substances, such as cinders and dust, cannot enter.

The bail L is useful as a means for suspending the two portions of the coupling from the platform of the car.

It will readily be seen that the latch will, by means of the pins J and openings K, easily remain in position on one portion of the coupling, safely, until the other portion, that is, the portion on the other car, is ready for being coupled on. Hence, but one latch of course will be needed for a car.

Having thus fully described my invention, what I claim, and desire to secure by Letters Patent, is—

1. In a pipe coupling, in combination, the tubes or pipes D provided with the external flanges or rings D'', and the latch consisting essentially of the semicircular jaw H provided with the internal flanges H' and the wedge shaped jaw I hinged to said jaw H and adapted to force the said flanges D'' apart against the flanges H', substantially as set forth.

2. In a pipe-coupling, the combination of the pipes D provided with the external flanges D'' perforated at K, and the latch consisting of the semicircular grooved jaw H provided with the external flanges H' and the pins J in the groove, the wedge shaped jaw I provided with the handle I'' and central passage I' said jaws being hinged together at N as shown, and the bail L for suspending the coupling, substantially as described.

JAMES C. MITCHELL.

Witnesses:
J. HOWARD WIGHT,
JOHN J. CAMPBELL.